(12) United States Patent
Takahashi et al.

(10) Patent No.: US 8,573,867 B2
(45) Date of Patent: Nov. 5, 2013

(54) FOCAL-PLANE SHUTTER AND OPTICAL INSTRUMENT

(75) Inventors: Hiroshi Takahashi, Chiba (JP); Hideki Tanaka, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/472,840

(22) Filed: May 16, 2012

(65) Prior Publication Data

US 2012/0224842 A1 Sep. 6, 2012

Related U.S. Application Data

(63) Continuation of application No. PCT/JP2011/054080, filed on Feb. 24, 2011.

(30) Foreign Application Priority Data

Jul. 26, 2010 (JP) ................................. 2010-167445

(51) Int. Cl.
*G03B 9/40* (2006.01)
*G03B 9/10* (2006.01)

(52) U.S. Cl.
USPC ........................... 396/484; 396/488; 396/493

(58) Field of Classification Search
USPC .......... 396/484, 452, 471, 483, 485, 488, 493
See application file for complete search history.

(56) References Cited

U.S. PATENT DOCUMENTS

| | | |
|---|---|---|
| 5,457,514 A | 10/1995 | Hasuda |
| 6,072,958 A * | 6/2000 | Hasuda .................. 396/235 |
| 2008/0118242 A1 | 5/2008 | Namai |

FOREIGN PATENT DOCUMENTS

| | | |
|---|---|---|
| JP | 06-250261 | 9/1994 |
| JP | 6-250261 | 9/1994 |
| JP | 11-258656 | 9/1999 |
| JP | 2004-246270 A1 | 9/2004 |
| JP | 2006-129223 A1 | 6/2008 |
| JP | 2008-129223 | 6/2008 |

OTHER PUBLICATIONS

International Search Report for International Application No. PCT/JP2011/054080 dated Jun. 7, 2011.
Korean Office action dated May 27, 2013, in the corresponding Korean patent application No. 10-2012-7012377, with English translation.

* cited by examiner

*Primary Examiner* — Rochelle-Ann J Blackman
(74) *Attorney, Agent, or Firm* — Kratz, Quintos & Hanson, LLP

(57) ABSTRACT

A focal plane shutter includes: a board including an opening; an arm including: a rear end portion rotatably supported by the board; and a front end portion swingable in response to rotation of the rear and portion; blades coupled to the arm for opening and closing the opening; and a sensor arranged at a position opposite to the arm across the opening, and detecting a state of the blades.

5 Claims, 9 Drawing Sheets

FOCAL-PLANE SHUTTER AND OPTICAL INSTRUMENT

CROSS-REFERENCE TO RELATED APPLICATION

This application is a continuation of and claims priority to International Patent Application No. PCT/JP2011/054080 filed on Feb. 24, 2011, which claims priority to Japanese Patent Application No. 2010-167445 filed on Jul. 26, 2010, subject matter of these patent documents is incorporated by reference herein in its entirety.

BACKGROUND (i) Technical Field

The present invention relates to focal plane shutters and optical instrument.

(ii) Related Art

Japanese Unexamined Patent Application Publication No. 6-250261 disclose: a board including an opening; an arm supported by the board, and blades coupled to the arm and capable of opening and closing the opening; and a sensor detecting a state of the blades. The sensor is arranged at a position opposite to the arm across the opening. The blades are composed of plural blades.

To suitably detect the state of the blades by the sensor, the blades need its size to sufficiently cover the sensor. For that purpose, it is considered that a blade extending in a direction perpendicular to the movable direction of the blades is employed. However, the large blade extending in the direction perpendicular to the movable direction of the blades is employed, thereby increasing the size of the board holding the blade in the direction where the blade extends. Thus, the size of the focal plane shutter is also increased.

SUMMARY

It is thus an object of the present invention to provide a focal plane shutter ensuring a detection accuracy of a blades state and suppressing an increase in size, and an optical instrument having the same.

According to an aspect of the present invention, there is provided a focal plane shutter including: a board including an opening; an arm including: a rear end portion rotatably supported by the board; and a front end portion swingable in response to rotation of the rear end portion; blades coupled to the arm for opening and closing the opening; and a sensor arranged at a position opposite to the arm across the opening, and detecting a state of the blades, wherein the blades include first and second blades, a coupling point of the second blade and the arm is positioned close to the rear end portion side of the arm as compared with a coupling point of the first blade and the arm, and the second blade includes: a rear end portion coupled to the arm; an intermediate portion capable of closing the opening; and a front end portion capable of covering at least a part of the sensor and having a shape projecting toward the first blade.

DETAILED DESCRIPTION

Figure 1:
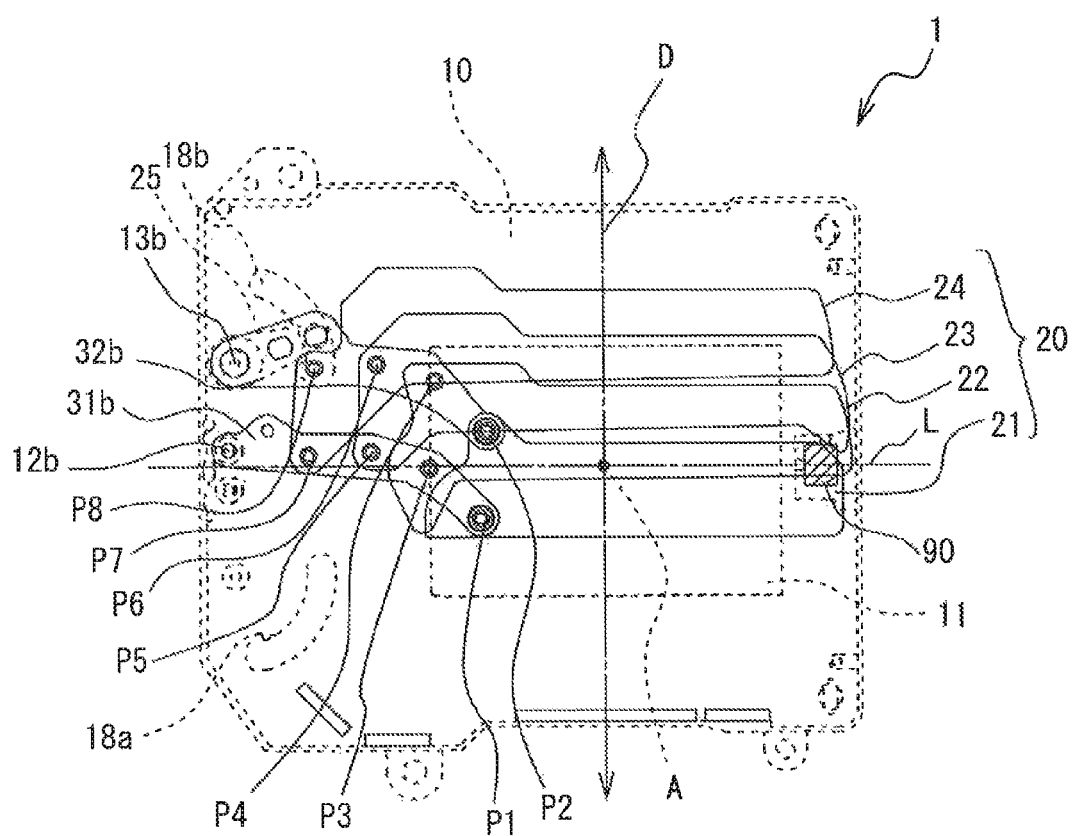
FIG. 1 is a front view of trailing blades, of a focal plane shutter according to the present embodiment, while a receding state is being shifted to a closing state.
Figure 2:
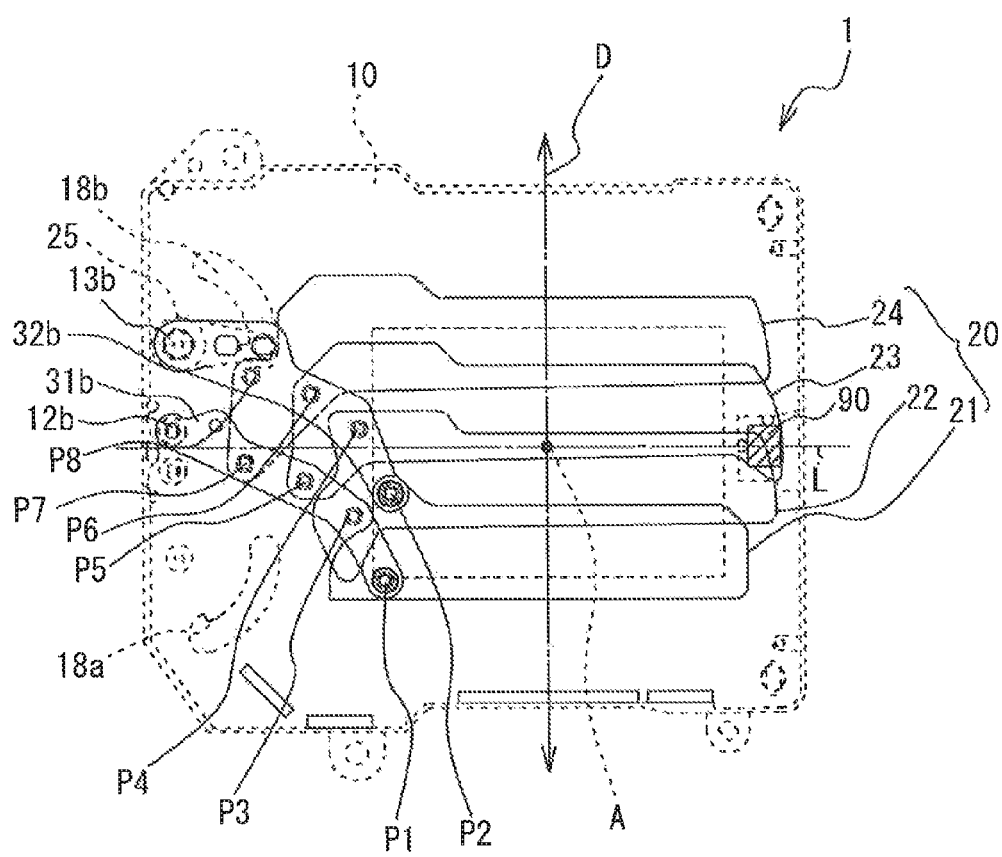
FIG. 2 is a front view of a state of the trailing blades just after an exposure operation of the focal plane shutter according to the present embodiment is finished.

FIGS. 1 and 2 are front view of a focal plane shutter according to the present embodiment. As illustrated in FIGS. 1 and 2, a focal plane shutter 1 includes: a board 10; leading blades; trailing blades 20; arms for the leading blades; arms 31b and 32b for the trailing blades; an electromagnet for the leading blades; an electromagnet for the trailing blades; a leading-blades lever; a trailing-blades lever 25; and a sensor 90. Additionally, FIG. 1 is a front view of the trailing blades of the focal plane shutter while a receding state is shifted to a closing state. FIG. 2 is a front view of a state of the trailing blades just after an exposure operation is finished. The leading blades, the arms for the leading blades, the electromagnet for the leading blades, the electromagnet for the trailing blades, and the leading-blades lever are omitted in FIGS. 1 and 2.

The board 10 is made of a synthetic resin, and includes an opening 11 with a rectangular shape. The trailing blades 20 is composed of four blades 21 to 24. Each of the blades 21 to 24 is made of a synthetic resin and is thinly formed. Also, each of the arms 31b and 32b is made of a metal sheet. The trailing blades 20 are capable of shifting between a receding state where the trailing blades 20 recede from the opening 11 and a closing state where the trailing blades 20 close the opening 11. The blades 21 to 24 overlap one another in the receding state. The blades 21 to 24 expand in the closing state.

Leading blades as will be described later and the trailing blades 20 open or close the opening 11. FIG. 1 illustrates a state where the trailing blades 20 are shifting from the receding state to the closing state with the leading blades receded from the opening 11. In FIG. 1, the trailing blades 20 are moving in the movable direction D toward the lower side of FIG. 1.

The trailing blades are coupled to the arms 31b and 32b. These arms 31b and 32b are swingably supported by spindles 12b and 13b provided in the board 10, respectively. The rear ends of the arms 31b and 32b are supported by the spindles 12b and 13b, respectively.

Figure 3:
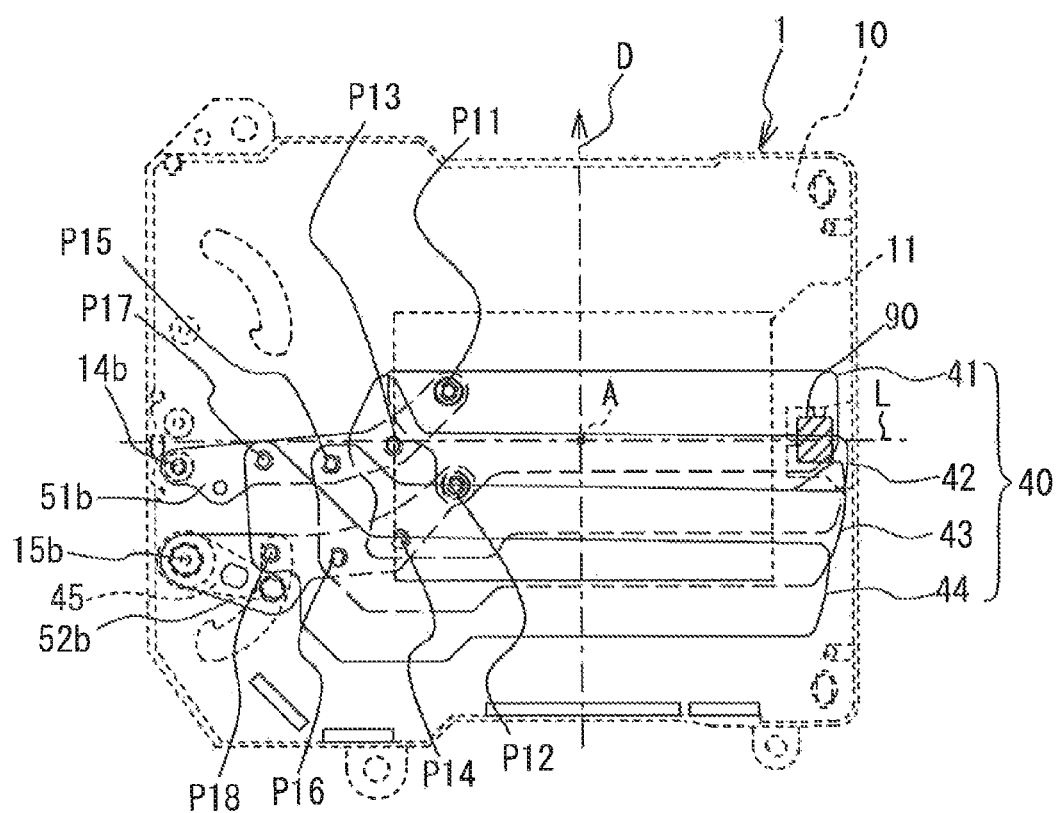
FIG. 3 is a front view of leading blades, of the focal plane shutter according to the present embodiment, while the closing state is being shifted to the receding state.

Also, the leading blades will be described. FIG. 3 is a front view of the leading blades 40, of the focal plane shutter according to the present embodiment, while the closing state is being shifted to the receding state. In FIG. 3, the trailing blades 20 recede from the opening 11, and the leading blades 40 are moving in the movable direction D toward the lower side of FIG. 3. The leading blades 40 are composed of four blades 41 to 44. Each of the blades 41 to 44 is made of a synthetic resin and is thinly formed. Also, each of arms 51b and 52b is made of a metal sheet. The leading blades 40 are capable of shifting between a closing state where the leading blades 40 close the opening 11 and a receding state where the leading blades 40 recede from the opening 11. The blades 41 to 44 overlap one another in the receding state and expand in the closing state. The leading blades 40 are coupled to the arms 51b and 52b. These arms 51b and 52b are swingably supported by spindles 14b and 15b provided in the board 10, respectively. The rear ends of the arms 51b and 52b are supported by the spindles 14b and 15b, respectively.

In the board 10, a trailing-blades lever 25 is provided for driving the arm 32b, and a leading-blades lever 45 is provided for driving the arm 52b. The trailing-blades lever 25 and the leading-blades lever 45 are each supported by the board 10 to swing in a given range. Specifically, the trailing-blades lever 25 and the leading-blades lever 45 are swingably supported about spindles formed on the board 10 respectively. The arm 32b is coupled to a pin of the trailing-blades lever 25. The arm 52b is coupled to a pin of the leading-blades lever 45. The trailing-blades lever 25 and the leading-blades lever 45 swing, thereby swinging the arm 32b and the arm 52b. Therefore, the trailing blades 20 and the leading blades 40 move. In the board 10, an escape slot 18b is formed for escaping the pin of the trailing-blades lever 25, and an escape slot 18a is formed for escaping the pin of the leading-blades lever 45.

The trailing-blades lever 25 holds an iron piece not illustrated. The trailing-blades lever 25 is movable such that the iron piece moves into and out of contact with the electromagnet for the trailing blades. The trailing-blades lever 25 is biased in such a direction where the iron piece moves away from the electromagnet for the trailing blades. The electromagnet for the trailing blades is energized, thereby adsorbing the iron piece of the trailing-blades lever 25. This configuration is applied to the leading-blades lever 45 and the electromagnet for the leading blades.

The blade 21 included in the trailing blades 20 is coupled to coupling points P1 and P2 which are the closest to the front end sides of the arms 31b and 32b. Likewise, the blade 22 is coupled to the coupling points P3 and P4 of the arms 31b and 32b. Likewise, the blade 23 is coupled to the coupling points P5 and P6 of the arms 31b and 32b. Likewise, the blade 24 is coupled to the coupling points P7 and P8 of the arms 31b and 32b.

Also, the leading blades 40 has the same structure. The blade 41 included in the leading blades 40 is coupled to coupling points P11 and P12 which are the closest to the front end sides of the arms 51b and 52b. Likewise, a blade 42 is coupled to coupling points P13 and P14 of the arms 51b and 52b. Likewise, the blade 43 is coupled to coupling points P15 and P16 of the arms 51b and 52b. Likewise, the blade 44 is coupled to coupling points P17 and P18 of the arms 51b and 52b.

Next, an operation of the focal plane shutter 1 will be described. In an initial state, a set lever not illustrated is secured at an initial position, the leading blades 40 are expanded to close the opening 11, and the trailing blades 20 are overlapped each other to recede from the opening 11. In this initial state, the iron pieces of the leading-blades lever 45 and the trailing-blades lever 25 respectively abut the electromagnet for the leading blades and the electromagnet for the trailing blades, and are set to be adsorbed thereto.

Figure 4:
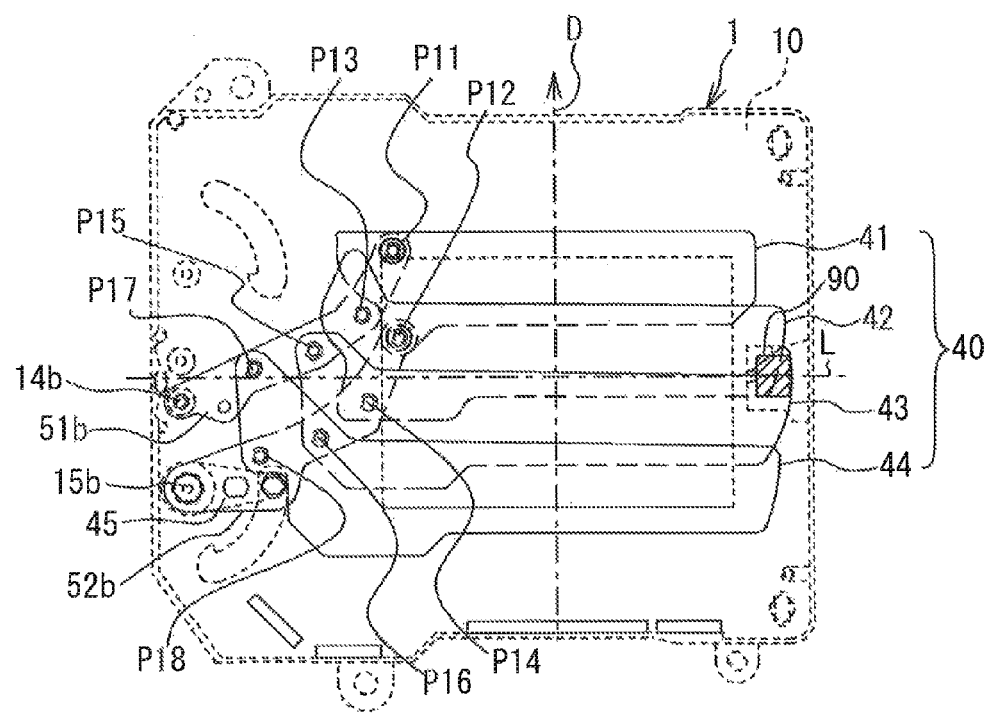
FIG. 4 is a front view of a state of the leading blades of the focal plane shutter according to the present embodiment in an initial state.

FIG. 4 illustrates the initial state of the leading blades 40.

In shooting, a release button of the camera is pushed to energize coils of the electromagnets for the leading blades and the trailing blades, whereby the iron piece of the leading-blades lever 45 is adsorbed to the electromagnet for the leading blades and the iron piece of the trailing-blades lever 25 is adsorbed to the electromagnet for the trailing blades. After that, the set lever recedes from the leading-blades lever 45 and the trailing-blades lever 25. Herein, the leading-blades lever 45 and the trailing-blades lever 25 are adsorbed to and held by the electromagnets for the leading blades and the trailing blades, respectively.

Afterward, the energization of the coil of the electromagnet for the leading blades is stopped, thereby rotating the leading-blades lever 45 clockwise by the biasing force of the spring. The leading blades 40 shift from the closing state to the receding state. FIG. 3 illustrates the leading blades 40 while the closing state is being shifted to the receding state. Therefore, the leading blades 40 recede from the opening 11 to be in the overlapped state. The energization of the coil of the electromagnet for the trailing blades remains for a predetermined period, whereas the trailing blades 20 remain away from the opening 11. This causes the opening 11 to be in an opened state.

After a predetermined period lapses from a time when the release button is pushed, the energization of the coil of the electromagnet for the trailing blades is stopped, and then the trailing-blades lever 25 rotates clockwise by the biasing force of the spring. Therefore, the trailing blades 20 are expanded to close the opening 11. FIG. 1 illustrates the trailing blades 20 while is moving. FIG. 2 illustrates the state of the trailing blades 20 just after the exposure operation is finished. In such a way, one cycle of shooting is finished.

Figure 5:
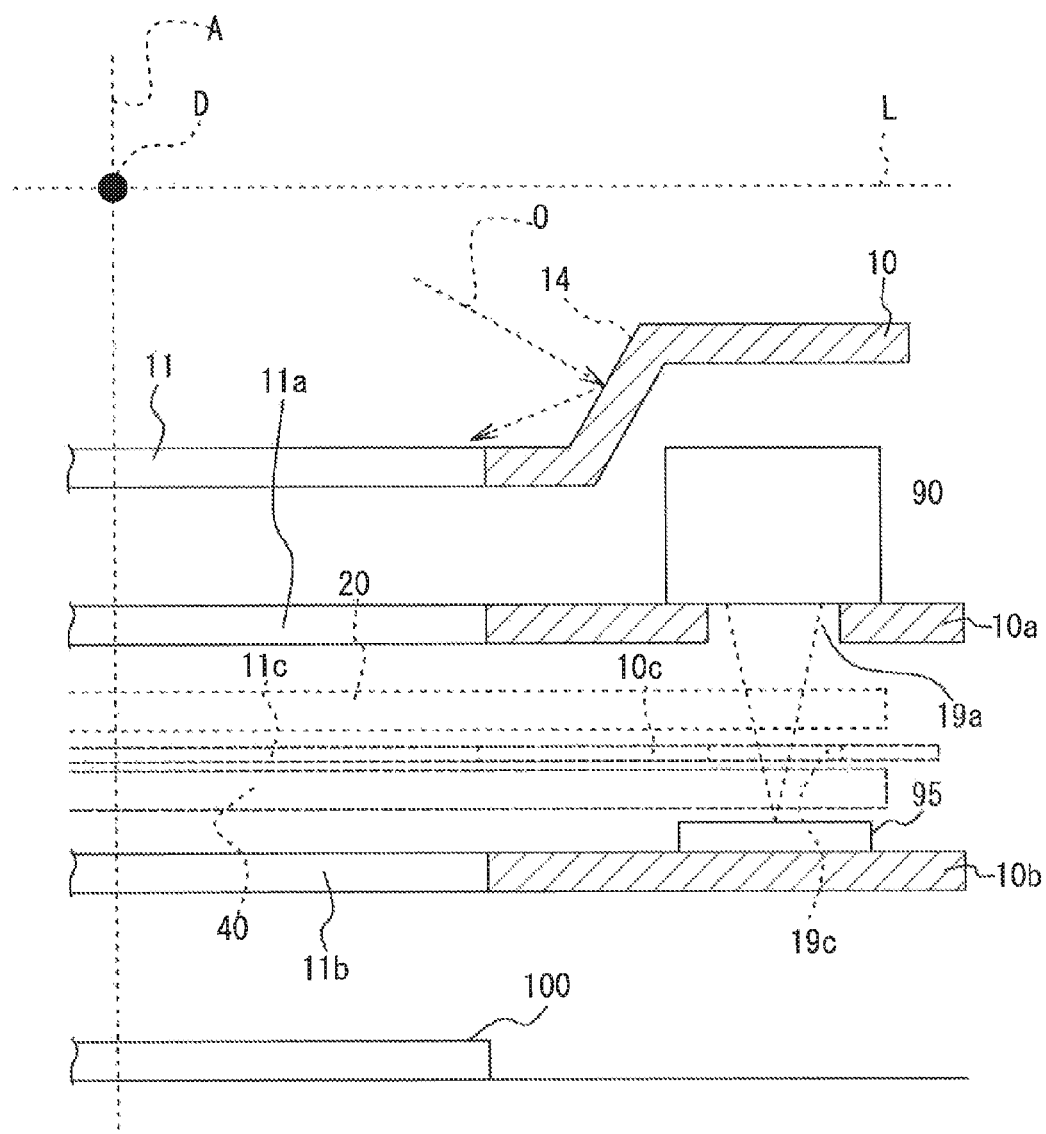
FIG. 5 is an explanatory view of a sensor of the focal plane shutter according to the present embodiment.

The sensor 90 will be described. FIG. 5 is an explanatory view of the sensor 90. FIG. 5 illustrates a cross section in the vicinity of the sensor 90. The sensor 90 includes a light emitting element and a light receiving element. An intermediate board 10a is arranged at a rear side of the board 10. A rear board 10b is arranged at a rear side of the intermediate board 10a. The board 10, the intermediate board 10a, and the rear board 10b are respectively formed with openings 11, 11a, and 11b for ensuring the optical path to an image pickup element 100 arranged on a camera side. The sensor 90 is arranged between the board 10 and the intermediate board 10a and secured on the intermediate board 10a. The intermediate board 10a is provided with a hole 19a for escaping a light emitted from the light emitting element of the sensor 90 and a light entering the light receiving element of the sensor 90.

A partition board 10c is provided between the intermediate board 10a and the rear board 10b, and is made of a synthetic resin with a thin shape. The partition board 10c is formed with an opening 11c for ensuring the optical path to the image pickup element 100 provided on the camera side. Further, the partition board 10c is provided with a hole 19c for escaping a light emitted from the light emitting element of the sensor 90 and a light entering the light receiving element. The trailing blades 20 are housed between the intermediate board 10a and the partition board 10c. The leading blades 40 are housed between the partition board 10c and the rear board 10b. A reflector plate 95 is provided on the rear board 10b at such a position to face the sensor 90.

As illustrated in FIG. 2, the trailing blades 20 overlap the sensor 90 when the leading blades 40 recede from the opening 11 and the trailing blades 20 are in the closing state. The trailing blades 20 do not overlap the sensor 90 when the trailing blades 20 are in the receding state. Further, as illustrated in FIG. 1, the trailing blades 20 start overlapping the sensor 90 while shifting from the receding state to the closing state. When the trailing blades 20 are in the receding state, the light emitted from the light emitting element of the sensor 90 is reflected by the reflector plate 95 to be received by the light receiving element of the sensor 90. When the trailing blades 20 are in the closing state, the light emitted from the light emitting element of the sensor 90 is cut by the trailing blades 20 and is not received by the light receiving element of the sensor 90. In such a way, the trailing blades 20 are determined whether or riot they are in the receding state or the closing state based on a level of the receiving light signal of the light receiving element of the sensor 90.

Likewise, the state of the leading blades 40 can be determined based on the sensor 90. As illustrated in FIG. 4, when the leading blades 40 expand to close the opening 11, the trailing blades 20 overlap each other to recede from the opening 11. Thus, the leading blades 40 overlap the sensor 90, and the light emitted from the light emitting element of the sensor 90 is blinded by the leading blades 40 and is not received by the light receiving element. Further, as the leading blades 40 is shifted to the receding state while is shifting from the closing state to the receding state, the leading blades 40 starts receding from the sensor 90. Thus, the light emitted from the light emitting element of the sensor 90 is reflected by the reflector plate 95 to be received by the light receiving element of the sensor 90. In such a way, the leading blades 40 are determined whether or not they are in the receding state or the closing state based on a level of the receiving light signal of the light receiving element of the sensor 90.

The sensor 90 is arranged at a position opposite to the arms 31b and 32b across the opening 11. Specifically, the sensor 90 is arranged on a virtual line L perpendicular to an optical axis A and perpendicular to the movable direction D of the trailing blades 20. Herein, the optical axis A is an optical axis of a lens arranged, in the camera, at the object side with respect to the board 10. A light entering through the lens passes to the image pickup element 100 through the opening 11.

Figure 6A:
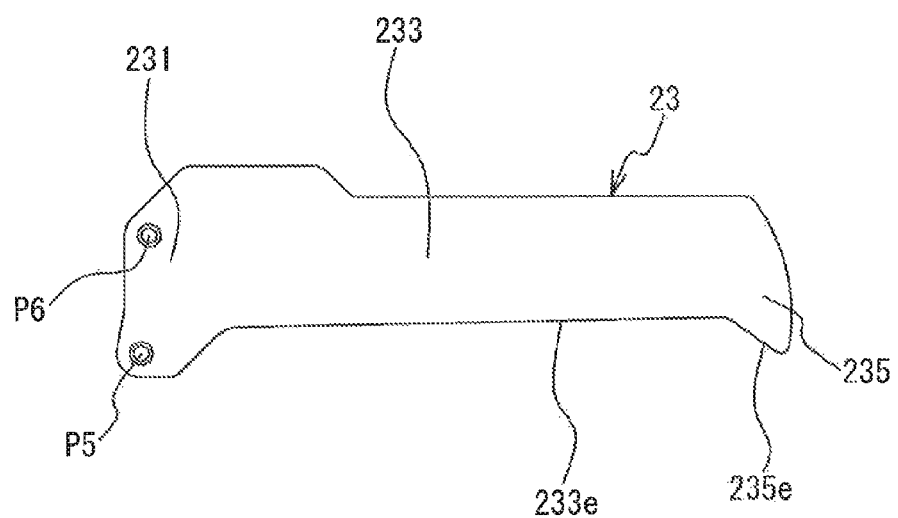
FIG. 6A is an explanatory view of the trailing blades.

Next, a shape of the blade 23 of the trailing blades 20 will be described. FIG. 6A is an explanatory view of the blade 23 of the trailing blades 20. As illustrated in FIG. 6A, the blade 23 includes a rear end portion 231, a intermediate portion 233, and a front end portion 235. The rear end portion 231 is rotatably coupled to the arms 31b and 32b at the coupling points P5 and P6. The intermediate portion 233 has a substantially rectangular shape extending in a direction perpendicular to the movable direction D of the blade 23, and is a portion for primarily closing the opening 11. The front end portion 235 is a portion for primarily covering the sensor 90, and extends toward the blades 21 and 22.

Herein, a relationship between the blade 23 and the blades 21, 22 will be described. The coupling points P5 and P6, where the blade 23 is coupled to the arms 31b and 32b, are arranged close to the rear end sides of the arms 31b and 32b as compared with the coupling points P1 and P2, where the blade 21 is coupled to the arms 31b and 32b. Likewise, the coupling points P5 and P6, where the blade 23 is coupled to the arms 31b and 32b, are arranged close to the rear end sides of the arms 31b and 32b as compared with the coupling points P3 and P4, where the blade 22 is coupled to the arms 31b and 32b. The blades 21 and 22 correspond to a first blade, and the blade 23 corresponds to a second blade.

The blade 23 includes: a first edge 233e defining the intermediate portion 233; a second edge 235e continuous with the first edge 233e, defining the front end portion 235, and projecting beyond the first edge 233e toward the blades 21 and 22. The first edge 233e is substantially perpendicular to the movable direction D of the trailing blades 20. The second edge 235e is inclined with respect to the movable direction D of the trailing blades 20.

Figure 6B:
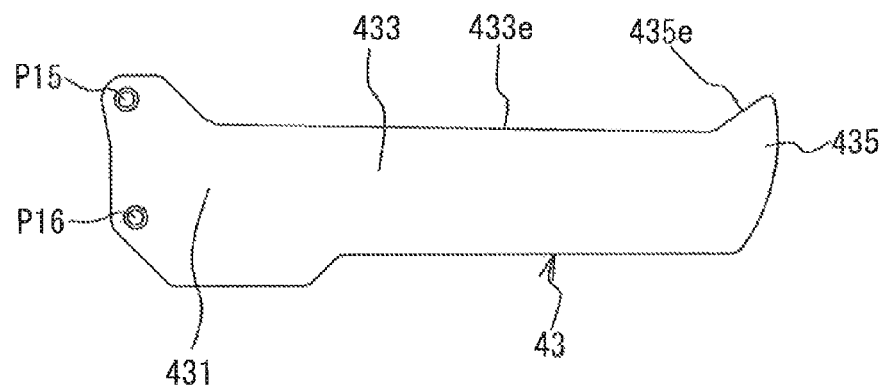
FIG. 6B is an explanatory view of the leading blades of the focal plane shutter according to the present embodiment.

FIG. 6B is an explanatory view of the blade 43 of the leading blades 40. The blade 43 of the leading blades 40 having the same structure with the blade 23 of the trailing blades 20 includes a rear end portion 431, an intermediate portion 433, and a front end portion 435. The rear end portion 431 is rotatably coupled to the arms 51b and 52b at the coupling points P15 and P16, respectively. The intermediate portion 433 for primarily closing the opening 11 has a substantially rectangular shape extending in a direction perpendicular to the movable direction D of the blade 43. The front end portion 435 for primarily covering the sensor 90 projects to the blades 41 and 42. Further, the coupling points P15 and P16, where the blade 43 is coupled to the arms 51b and 52b, are arranged close to the rear end sides of the arms 51b and 52b as compared with the coupling points P11 and P12, where the blade 41 is coupled to the arms 51b and 52b, and as compared with the coupling points P13 and P14, where the blade 42 is coupled to the arms 51b and 52b. The blade 43 includes: a first edge 433e defining the intermediate portion 433; and a second edge 435e continuous with the first edge 433e, defining the front end portion 435, and projecting beyond the first edge 433e toward the blades 41 and 42. The first edge 433e is substantially perpendicular to the movable direction D of the leading blades 40. The second edge 435e is inclined with respect to the movable direction D of the leading blades 40. Herein, the blades 41 and 42 correspond to a first blade, and the blade 43 corresponds to a second blade.

Figure 7:
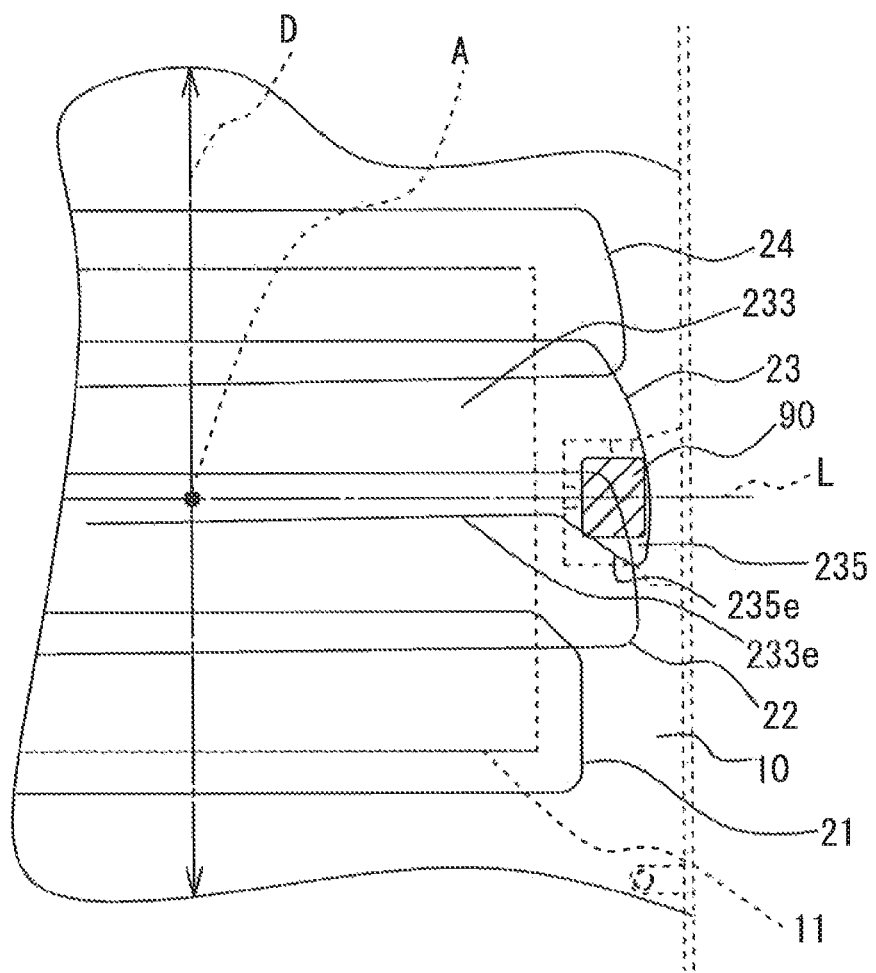
FIG. 7 is a partially enlarged view of the focal plane shutter 1 in the closing state of the trailing blades of the focal plane shutter according to the present embodiment.

FIG. 7 is an enlarged view of the focal plane shutter 1 where the trailing blades 20 are in the closing state. As illustrated in FIG. 7, the front end portion 235 of the blade 23 covers most of the sensor 90 in the closing state. Additionally, the front end portions of the blades 21, 22, and 24 each do not have a projecting shape such as the shape of the front end portion 235 of the blade 23.

Figure 8:
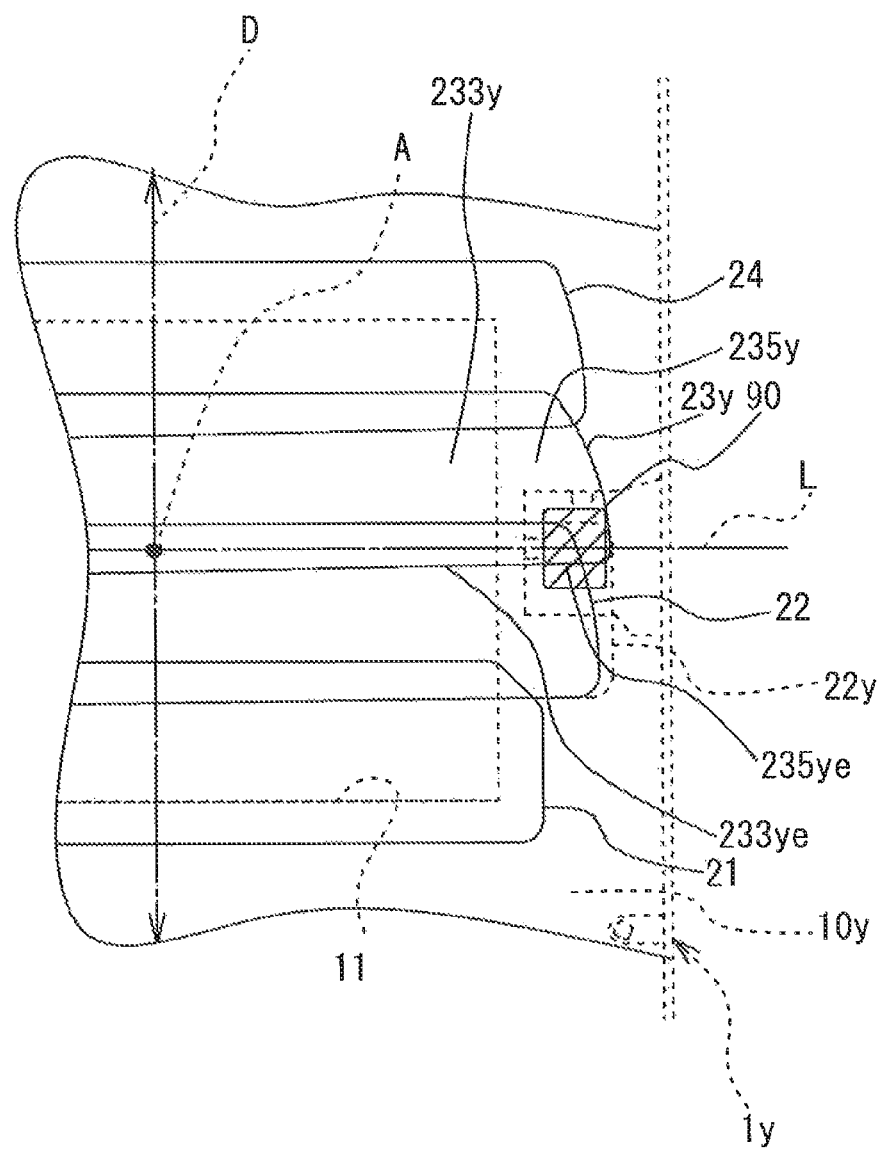
FIG. 8 is an explanatory view of a focal plane shutter employing a blade having a shape different from that of a blade of the trailing blades of the focal plane shutter according to the present embodiment.

FIG. 8 is an explanatory view of a focal plane shutter 1y employing a blade 23y with a shape different from that of the blade 23 of the focal plane shutter 1 according to the present embodiment. Additionally, FIG. 8 also illustrates the closing state of the trailing blades. A front end portion 235y of the blade 23y does not project toward the blades 21 and 22, unlike the front end portion 235 of the blade 23 of the focal plane shutter 1 according to the present embodiment. Specifically, a first edge 233ye defining the intermediate portion 233y and a second edge 235ye defining the front end portion 235y are aligned substantially on the same line. That is, the front end portion 235y of the blade 23y has a shape substantially the same with the shape of each of the front end portions of the blades 21, 22, and 24. For this reason, when the trailing blades of the focal plane shutter 1y are in the closing state, a part of the sensor 90 cannot be covered as illustrated in FIG. 8. Specifically, the blade 23y and the blade 22 cover the sensor 90, but cannot cover the whole sensor 90. For this reason, the light emitted from the light emitting element of the sensor 90 is partially reflected by the reflector plate 95 to be received by the light receiving element of the sensor 90. In this case, it might be difficult to determine whether or not the trailing blades are in the receding state or the closing state. Therefore, the detection accuracy of the sensor 90 might be degraded.

Herein, it is conceivable to use a blade 22y extending in a direction perpendicular to the movable direction D of the trailing blades instead of the blade 22. The direction perpendicular to the movable direction of the blades is defined as a width direction. The blade 22y is employed, whereby the blade 22y and the blade 23y cover the sensor 90 even when the trailing blades are in the closing state. This can prevent the detection accuracy of the sensor 90 from being degraded. However, such a large blade 22y is employed, thereby causing the following problem.

Figure 9:
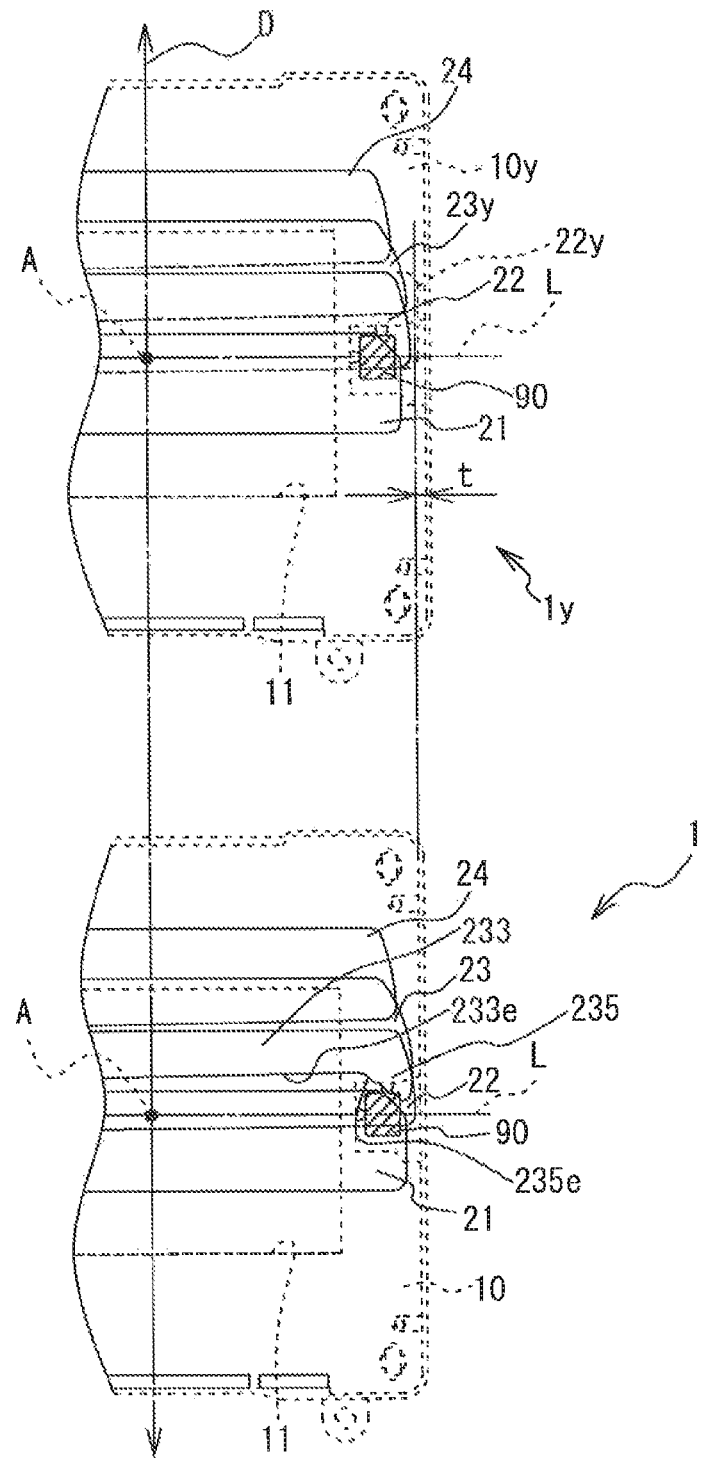
FIG. 9 is a comparative view of the trailing blades, of the focal plan shutter according to the present embodiment, while the receding state is being shifted to the closing state.

FIG. 9 is a comparative view of the focal plane shutter 1y and the focal plane shutter 1 while the receding state is being shifted to the closing state. Additionally, reference numerals are partially omitted in the focal plane shutter 1y as illustrated in FIG. 9. The focal plane shutter 1y is illustrated at the upper side in FIG. 9, and the focal plane shutter 1 is illustrated at the lower side in FIG. 9. Since the blade 22y is made larger than the blade 22 in the width direction, a board by is also made larger than the board 10 in the width direction. If the board 10y extending in the width direction is not employed in accordance with the employment of the blade 22y extending in the width direction, the blade 22y protrudes from the board while the receding state is being shifted to the closing state.

However, the front end portion 235 of the blade 23 of the focal plane shutter 1 according to the present embodiment projects toward the blades 21 and 22 without making the blade 22 extending in the width direction. Therefore, the sensor 90 is covered without making the board 10 extending in the width direction. In such a way, the focal plane shutter 1 according to the present embodiment ensures the detection accuracy of the blades state while suppressing the increase in size.

The above example has described the focal plane shutter 1 according to the present embodiment and the focal plane shutter 1y employing the blade 23y having a shape different from that of the blade 23 of the trailing blades 20 of the focal plane shutter 1 according to the present embodiment, for comparison. The leading blades 40 also has the structure similar to the trailing blades 20. The front end portion 435 of the blade 43 of the focal plane shutter 1 according to the present embodiment projects toward the blades 41 and 42 without making the blade 42 extending in the width direction. Accordingly, this can cover the sensor 90, suppresses the increase in size, and ensures the detection accuracy of the blades state, without making the board 10 extending in the width direction.

Additionally, the sensor 90 is considered to be covered by arranging the sensor 90 as close as possible to the opening 11 without making the blade extending in the width direction. However, this consideration is inappropriate. As illustrated in FIG. 5, the sensor 90 has a given thickness in the direction of the optical axis A. The board 10 is formed with an inclined portion 14 for escaping the thickness of the sensor 90. Thus, when the sensor 90 is too close to the opening 11, the inclined portion 14 is also made too close to the opening 11. Therefore, the objective light O reflected by the inclined portion 14 might enter the opening 11 as illustrated in FIG. 5. This might adversely influence the image quality. In such a way, it is necessary for the sensor 90 to be spaced apart from the opening 11 to some extent in consideration of the influence on the image quality.

The front end portion 235 of the blade 23 does not overlap the opening 11 in any of the receding state, the closing state, and the state between the receding state and the closing state. In other words, the second edge 235e does not overlap the opening 11 in any state. These arrangements are applied to the leading blades. This is because the pin of the leading-blades lever might abut an end portion of the escape slot 18a and then might bound when the leading blades shift from the closing state to the receding state. The leading-blades lever bounds, whereby the front end portion, corresponding to the front end portion 235 mentioned above, of the blade of the leading blades might partially overlap the opening 11. Therefore, the blade might partially overlap the opening 11 again just after the opening 11 is opened. Thus, the image quality might be influenced. However, the front end portion 235 is provided not to overlap the opening 11 in any state, thereby preventing the influence on the image quality in bounding.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical instrument such as a still camera or a digital camera.

Although the blade made of a synthetic resin has been described in the present embodiment, the blade having the thin shape may be made of a metal.

In the above embodiment, the front end portion 235 of the blade 23 covers most of the sensor 90 when the trailing blades 20 is completely shifted to the closing state. However, this invention is not limited to this configuration. For example, the blade may include a front end portion which covers the sensor 90 while the receding state is being shifted to the closing state and which does not cover the sensor 90 when the closed state is completely shifted.

In blades composed of four blades, a front end portion of a second blade may project toward a first blade. In blades composed of two blades, a front end portion of a second blade may project toward a first blade. In blades composed of three blades, a front end portion of a second blade may project toward a first blade. In blades composed of five blades, a front end portion of a second blade may project toward a first blade. In blades composed of five blades, a front end portion of a third blade may project toward a first blade. In blades composed of five blades, a front end portion of a fourth blade may project toward a first blade. Additionally, the above first blade is a blade having a coupling point coupling to the arm closest to the front end side of the arm.

The above second to fourth blades are second to fourth blades counted from the first blade. The above blades are the leading blades and/or the trailing blades.

Finally, several aspects of the present invention are summarized as follows.

According to an aspect of the present invention, there is provided a focal plane shutter including: a board including an opening; an arm including: a rear end portion rotatably supported by the board; and a front end portion swingable in response to rotation of the rear end portion; blades coupled to the arm for opening and closing the opening; and a sensor arranged at a position opposite to the arm across the opening, and detecting a state of the blades, wherein the blades include first and second blades, a coupling point of the second blade and the arm is positioned close to the rear end portion side of the arm as compared with a coupling point of the first blade and the arm, and the second blade includes: a rear end portion coupled to the arm; an intermediate portion capable of closing the opening; and a front end portion capable of covering at least a part of the sensor and having a shape projecting toward the first blade.

Since the second blade has the front end portion capable of covering at least a part of the sensor and having a shape projecting toward the first blade, the sensor can be covered without increasing the size of the board.

According to another aspect of the present invention, there is provided an optical instrument including the above focal plane shutter.

What is claimed is:
1. A focal plane shutter comprising:
a board including an opening;

an arm including: a rear end portion rotatably supported by the board; and a front end portion swingable in response to rotation of the rear end portion;
blades coupled to the arm for opening and closing the opening; and
a sensor arranged at a position opposite to the arm across the opening, and detecting a state of the blades,
wherein the blades include first and second blades,
a coupling point of the second blade and the arm is positioned close to the rear end portion side of the arm as compared with a coupling point of the first blade and the arm, and
the second blade includes: a rear end portion coupled to the arm; an intermediate portion capable of closing the opening; and a front end portion capable of covering at least a part of the sensor and having a shape projecting toward the first blade.

2. The focal plane shutter of claim 1, wherein the front end portion of the second blade does not overlap the opening.

3. The focal plane shutter of claim 1, wherein the second blade includes: a first edge defining the intermediate portion; and a second edge defining the front end portion, the second edge is continuous with the first edge, and is projecting beyond the first edge toward the first blade.

4. The focal plane shutter of claim 1, wherein the sensor is arranged on a virtual line perpendicular to an optical axis of a lens arranged at an object side of the board and perpendicular to a movable direction of the blades.

5. An optical instrument comprising a focal plane shutter, the focal plane shutter comprising:
a board including an opening;
an arm including: a rear end portion rotatably supported by the board; and a front end portion swingable in response to rotation of the rear end portion;
blades coupled to the arm for opening and closing the opening; and
a sensor arranged at a position opposite to the arm across the opening, and detecting a state of the blades,
wherein the blades include first and second blades,
a coupling point of the second blade and the arm is positioned close to the rear end portion side of the are as compared with a coupling point of the first blade and the arm, and
the second blade includes: a rear end portion coupled to the arm; an intermediate portion capable of closing the opening; and a front end portion capable of covering at least a part of the sensor and having a shape projecting toward the first blade.

* * * * *